US012802296B2

(12) United States Patent
Supino et al.

(10) Patent No.: US 12,802,296 B2
(45) Date of Patent: Nov. 17, 2026

(54) GENERATIVE DIGITAL PRINTING

(71) Applicant: Sup, Inc., New York, NY (US)

(72) Inventors: Christopher Supino, Long Island City, NY (US); Dominik Andreas Hofmann, Brooklyn, NY (US); William Scott Dodge, Jr., Portland, OR (US); Kaesha Freyaldenhoven, San Luis Obispo, CA (US); Robert Patrick Mckenna, Holmdel, NJ (US); Yumi Yamazaki, Culver City, CA (US)

(73) Assignee: Sup, Inc., New York, NY (US)

( * ) Notice: Subject to any disclaimer, the term of this patent is extended or adjusted under 35 U.S.C. 154(b) by 157 days.

(21) Appl. No.: 18/752,211

(22) Filed: Jun. 24, 2024

(65) Prior Publication Data

US 2024/0428487 A1 Dec. 26, 2024

Related U.S. Application Data

(60) Provisional application No. 63/509,911, filed on Jun. 23, 2023.

(51) Int. Cl.
*G06T 11/10* (2026.01)
*G06F 3/12* (2006.01)
*G06T 11/60* (2026.01)

(52) U.S. Cl.
CPC ............ *G06T 11/10* (2026.01); *G06F 3/1206* (2013.01); *G06F 3/1242* (2013.01); *G06T 11/60* (2013.01); *G06F 3/1267* (2013.01); *G06F 3/1285* (2013.01)

(58) Field of Classification Search
None
See application file for complete search history.

(56) References Cited

U.S. PATENT DOCUMENTS

2020/0007914 A1* 1/2020 Peng ................ H04M 1/72448

FOREIGN PATENT DOCUMENTS

EP 3211891 A1 * 8/2017 ........... G07G 1/0072

OTHER PUBLICATIONS

Achive_James, How to create generative animated NFT art in under an hour!, https://web.archive.org/web/20220412135912/https://jalagar-eth.medium.com/how-to-create-generative-animated-nft-art-in-under-an-hour-e7dab1785c56 (Year: 2022).*

(Continued)

*Primary Examiner* — Kee M Tung
*Assistant Examiner* — Biao Chen
(74) *Attorney, Agent, or Firm* — Patterson + Sheridan, LLP

(57) ABSTRACT

Techniques for generating an image using artwork combinations. The techniques include identifying artwork elements and generating artwork combinations using the artwork elements. Each of the artwork combinations includes two or more of the artwork elements, and each of the artwork combinations is unique compared with the other artwork combinations. The techniques further include determining a plurality of metadata relating to the artwork combinations. The techniques further include generating a first image using the artwork combinations, including selecting a first artwork combination including a first plurality of artwork elements, retrieving a first plurality of images corresponding to the first plurality of artwork elements, identifying a layering order for the first plurality of artwork elements, and creating the first image based on combining the first plurality of images using the layering order. The techniques further include printing a physical item using the first image and the determined plurality of metadata.

17 Claims, 10 Drawing Sheets

(56) References Cited

OTHER PUBLICATIONS

Homburg et al., Metadata schema and ontology for capturing and processing of 3D cultural heritage objects. Herit Sci 9, 91 (2021), https://doi.org/10.1186/s40494-021-00561-w (Year: 2021).*
Rutten, Grayscale to Color Digital Painting Instantly with Photoshop, https://www.youtube.com/watch?v=N27kmaaYTh4, Jan. 14, 2022 (Year: 2022).*
Phlearn, Creative Coloring with Gradient Maps in Photoshop, Youtube, https://www.youtube.com/watch?v=Rb7kP-KbQVM (Year: 2020).*
VerticDesign, Photoshop How To Change Color of Object—With Masks Part 2 (Adobe Photoshop CS6/CC Tutorial, Youtube, https://www.youtube.com/watch?v=1_3ClwISQwc, Mar. 18, 2017 (Year: 2017).*

* cited by examiner

700

810

GENERATIVE DIGITAL PRINTING

CROSS-REFERENCE TO RELATED APPLICATIONS

This application claims the benefit of and priority to U.S. Provisional Patent Application No. 63/509,911, filed on Jun. 23, 2023, the entire contents of which are incorporated herein by reference.

INTRODUCTION

Generative digital printing is a challenging problem. For example, human artists can create numerous elements to be combined into artwork. But generating digital artwork (e.g., unique digital artwork) from these elements, while maintaining artistic design and technical efficiency, is very difficult.

SUMMARY

Embodiments include a method. The method includes identifying a plurality of artwork elements, and generating a plurality of artwork combinations using the plurality of artwork elements. Each of the artwork combinations includes two or more of the plurality of artwork elements, and each of the artwork combinations is unique compared with the other artwork combinations in the plurality of artwork combinations. The method further includes determining a plurality of metadata relating to the plurality of artwork combinations. The method further includes generating, using one or more computer processors, a first image using the plurality of artwork combinations, including: selecting a first artwork combination from among the plurality of artwork combinations, the first artwork combination including a first plurality of artwork elements, retrieving a first plurality of images corresponding to the first plurality of artwork elements, identifying a layering order for the first plurality of artwork elements, and creating the first image based on combining the first plurality of images using the layering order. The method further includes printing a physical item using the first image and the determined plurality of metadata.

Embodiments further include a non-transitory computer program product including one or more non-transitory computer readable media containing, in any combination, computer program code that, when executed by operation of any combination of one or more processors, performs operations. The operations include identifying a plurality of artwork elements and generating a plurality of artwork combinations using the plurality of artwork elements. Each of the artwork combinations includes two or more of the plurality of artwork elements, and each of the artwork combinations is unique compared with the other artwork combinations in the plurality of artwork combinations. The operations further include determining a plurality of metadata relating to the plurality of artwork combinations. The operations further include generating a first image using the plurality of artwork combinations, including: selecting a first artwork combination from among the plurality of artwork combinations, the first artwork combination including a first plurality of artwork elements, retrieving a first plurality of images corresponding to the first plurality of artwork elements, identifying a layering order for the first plurality of artwork elements, and creating the first image based on combining the first plurality of images using the layering order. The operations further include printing a physical item using the first image and the determined plurality of metadata.

Embodiments further include a system, including one or more processors and one or more memories storing a program, which, when executed on any combination of the one or more processors, performs operations. The operations include identifying a plurality of artwork elements and generating a plurality of artwork combinations using the plurality of artwork elements. Each of the artwork combinations includes two or more of the plurality of artwork elements, and each of the artwork combinations is unique compared with the other artwork combinations in the plurality of artwork combinations. The operations further include determining a plurality of metadata relating to the plurality of artwork combinations. The operations further include generating a first image using the plurality of artwork combinations, including: selecting a first artwork combination from among the plurality of artwork combinations, the first artwork combination including a first plurality of artwork elements, retrieving a first plurality of images corresponding to the first plurality of artwork elements, identifying a layering order for the first plurality of artwork elements, and creating the first image based on combining the first plurality of images using the layering order. The operations further include printing a physical item using the first image and the determined plurality of metadata.

DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
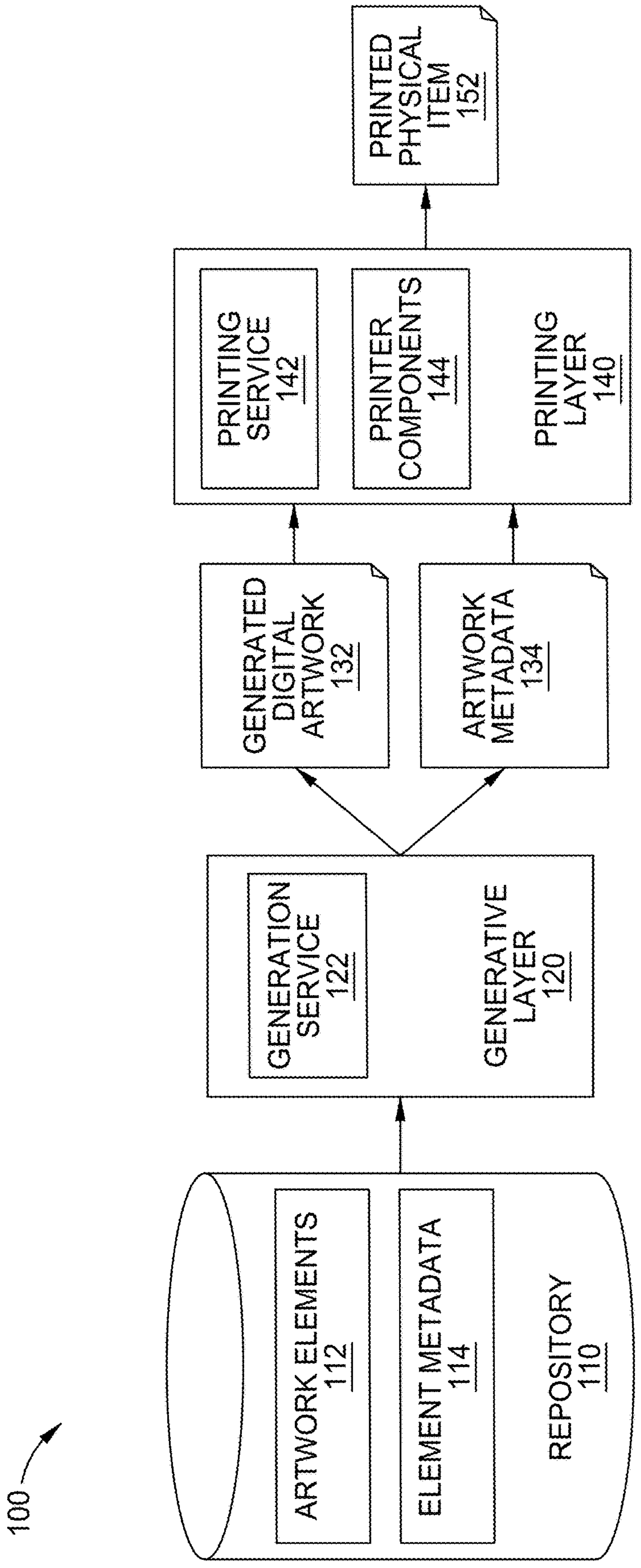
FIG. 1 depicts a computing environment for generative digital printing, according to one embodiment.

One or more techniques described herein provide a generative digital art platform, designed to use computer software to create a vast range of outputs (e.g., unique output for printing on physical media) from a defined set of artistic elements. In an embodiment, these elements are crafted by artists and combined in different permutations to produce numerous unique designs. The platform can be capable of generating hundreds of thousands, or even millions, of distinct combinations from a typical set of interchangeable elements (e.g., 5 to 8 interchangeable elements), each having several available options (e.g., 5 to 8 options for each element). This is merely an example, and any suitable number of elements and options can be used (e.g., more than 5-8 elements with 5-8 options, or fewer than 5-8 elements with 5-8 options).

In an embodiment, the generative digital art platform utilizes a combinatorial algorithm to generate all possible combinations from a set of elements (e.g., using a suitable software development platform). This algorithm works in conjunction with a layering system, which takes into account the order of elements to ensure appropriate positioning and overall coherence of the final artwork. Furthermore, each element can have multiple associated layers and be maintained in grayscale, and the platform can apply color palettes to the grayscale images using gradient maps and masking.

For example, inputs to the generative digital art platform can include grayscale versions of artwork elements, layering order, and color palettes in the form of gradient maps. Each element can consist of multiple layers and variants, with the element type and variant being defined using any suitable technique (e.g., by the directory structure of the assets in a file system). This is merely an example, and any suitable inputs can be used (e.g., color versions of the artwork elements, textual elements, graphical elements, and any other suitable information). For example, any combination of textual and graphical elements could be used instead of, or in addition to, grayscale or color artwork elements.

In an embodiment, the output of the generative digital art platform is a set of print-ready files for physical media, and potentially digital collectibles, representing unique combinations of the provided artistic elements. Additionally, the generative digital art platform can generate associated metadata that describes the individual elements used in the specific artwork. In an embodiment, the generative digital art platform can be used for printing any suitable physical media made from any suitable physical materials. This is discussed further, below, with regard to FIG. 1. Further, the generative digital art platform can be used to generate digital items (e.g., in addition to, or instead of, physical items). For example, block-chain based tokens (e.g., non-fungible tokens (NFTs) or semi-fungible tokens), or any other suitable digital items.

In an embodiment, as part of the process flow designers and artists define the composition and style of the artwork and produce the artwork for each element option (e.g., considering layering and positioning logic). The artists, or any other suitable persons, can identify interchangeable elements and create variations for each. The generative digital art platform then uses the artwork elements to generate all unique combinations, for the digital art. Metadata for each unique design is created, and output files are formatted for printing. Print-ready files are sent to the printer, and the printer prints the final products (e.g., physical media).

In an embodiment, the generative digital art platform generates a vast number of unique artwork pieces by incorporating a unique layering system that ensures the positional accuracy and aesthetic of the final designs. This allows for a high degree of customization while retaining a unified artistic style. Further, in an embodiment the generative digital art platform automatically generates metadata for each piece, and facilitating categorization, tracking, and potential future uses like customer personalization or targeted marketing.

One or more aspects of the generative digital art platform disclosed herein can provide significant advantages over prior solutions. For example, the generative digital art platform can greatly increase time efficiency for artists compared to hand drawing or prior digital art platforms. Generative printing using one or more of the techniques discussed herein can reduce the time required to create complex and intricate designs, and can generate a wide range of unique and visually captivating combinations in a fraction of the time it would take to create them by hand or using prior digital art platforms. This time efficiency allows artists to explore multiple areas, experiment with different styles and produce a higher volume of work within a given time frame.

As another example, the generative digital art platform can allow for inspiration and serendipity for artists and artwork. Generative printing using one or more of the techniques discussed herein can introduce an element of randomness into the creative process. Artists can set certain parameters and let the platform generate unexpected results, sparking new ideas and pushing artistic boundaries. This element of surprise and unpredictability can serve as a rich source of inspiration, leading to innovative and groundbreaking work. Further, the generative digital art platform can improve scalability and reproducibility. Generative printing using one or more of the techniques discussed herein can be easily scaled up or down to fit different mediums and sizes. This can facilitate creating large scale installations, producing prints for mass distribution, or any other desired goal. These techniques further allow artists to adapt their creations to various formats without compromising the quality or integrity of their work.

Further, one or more of the techniques discussed below provide additional technical advantages. As one example, in an embodiment the generative digital art platform is highly efficient compared to alternative techniques. Alternative solutions could maintain a large number of different features to produce the required hundreds or thousands of unique outputs (e.g., a different feature value for every possible feature or combination of features). Using one or more techniques disclosed herein, a generative digital art platform can operate much more efficiently, in terms of computation and memory use among other factors, by managing a more limited number of artistic elements (e.g., a set of 5 to 8 interchangeable elements, each having 5 to 8 options) and using layering and masking techniques, to produce hundreds of thousands of unique outputs. This provides a significant technical advantage over alternative solutions by increasing computational efficiency (e.g., reducing the number of needed computational resources) and memory efficiency (e.g., reducing the quantity of electronic storage used).

Further, in an embodiment, the generative digital art platform can integrate seamlessly with printing technologies. The generative digital art platform can automatically format output files to meet printing requirements, ensuring a smooth transition from design to production. This can reduce computational requirements need to convert files or operate printing platforms, and can reduce development and debugging time needed for printing platforms.

FIG. 1 depicts a computing environment 100 for generative digital printing, according to one embodiment. In an embodiment, a repository 110 includes one or more artwork elements 112 and one or more items of element metadata 114, among other items. For example, the repository 110 can be an electronic database (e.g., a relational database, graph database, or any other suitable electronic database), a cloud repository (e.g., a public cloud, private cloud, hybrid cloud, or any other suitable cloud repository), an on-premises electronic repository, or any other suitable electronic repository.

In an embodiment, the artwork elements 112 includes artistic elements for use in generative digital printing. For example, the artwork elements 112 can include a defined set of artistic elements crafted by one or more artists. These artistic elements can be combined in different permutations to produce varying designs (e.g., unique designs). This is discussed further, below, with regard to FIGS. 3-6, and illustrated in FIGS. 7A-9. In one example, each element of the artwork elements 112 is crafted by one or more human artists. Alternatively, one or more aspects of the artwork elements 112 are crafted using automated techniques (e.g., using machine learning (ML) or any other suitable artificial intelligence (AI) techniques). For example, one or more of the artwork elements 112 can be partially, or fully, crafted using ML or other automated techniques.

In an embodiment, the element metadata 114 describes one or more aspects of the artwork elements 112. For example, the element metadata 114 can describe individual elements used in generating completed artwork. This can be used to track the artwork and identify the uniqueness of a given piece of artwork (e.g., by identifying which elements from the artwork elements 112 are included in a given piece of art). This is discussed further, below, with regard to FIG. 3.

In an embodiment, the artwork elements 112 and element metadata 114 are used by a generative layer 120 to create generated digital artwork 132 and artwork metadata 134. For example, the generative layer 120 can include a generation service 122, and any other suitable software services. The generation service 122 can, in an embodiment, facilitate creating digital artwork by generating combinations (e.g., all possible combinations) from the artwork elements 112 and using those combinations, along with one or more layering techniques, to create the generated digital artwork 132. For example, the generation service 122 can take into account an order of elements (e.g., a layering order of the artwork elements 112) to ensure appropriate positioning and overall coherence of the final artwork. This is discussed further, below, with regard to FIGS. 3-6.

In an embodiment, the generated digital artwork 132 and artwork metadata 134 are provided to a printing layer 140. The printing layer 140 includes a printing service 142 and one or more printer components 144. In an embodiment, the printing service 142 is a suitable software service to facilitate printing a printed physical item 152 (e.g., a piece of physical art) from the generated digital artwork 132 and artwork metadata 134, using the printer components 144 (e.g., physical printer components). The printed physical item 152 can include paper media (e.g., any suitable books, posters, or other suitable paper items), garments (e.g., t-shirts, sweatshirts, hats, knitwear, or any other suitable garments), trading cards (e.g., paper, plastic, metal, or any other suitable trading cards), 3D-printing (e.g., action figures, dolls, toys, silicon tags for garments or other objects, or any other suitable 3D items), or any other suitable items.

Further, the use of the printing layer 140 to print a physical item is merely one example. Alternatively, or in addition, the generated digital artwork 132 and artwork metadata 134 can be used to generate digital items (e.g., in addition to, or instead of, physical items). For example, the generated digital artwork 132 and artwork metadata 134 can be used to create block-chain based tokens (e.g., NFTs or semi-fungible tokens) associated with digital artwork, or any other suitable digital items.

While the repository 110, generative layer 120, and printing layer 140 are each illustrated as a single entity, in an embodiment, the various components can be implemented using any suitable combination of physical compute systems, cloud compute nodes and storage locations, or any other suitable implementation. For example, the repository 110, generative layer 120, and printing layer 140, or any combination thereof, could be implemented using a server or cluster of servers. As another example, the repository 110, generative layer 120, and printing layer 140, or any combination thereof, can be implemented using a combination of compute nodes and storage locations in a suitable cloud environment. For example, one or more of the components of the repository 110, generative layer 120, and printing layer 140, or any combination thereof, can be implemented using a public cloud, a private cloud, a hybrid cloud, or any other suitable implementation, or using a suitable on-premises compute and storage system.

Figure 2:
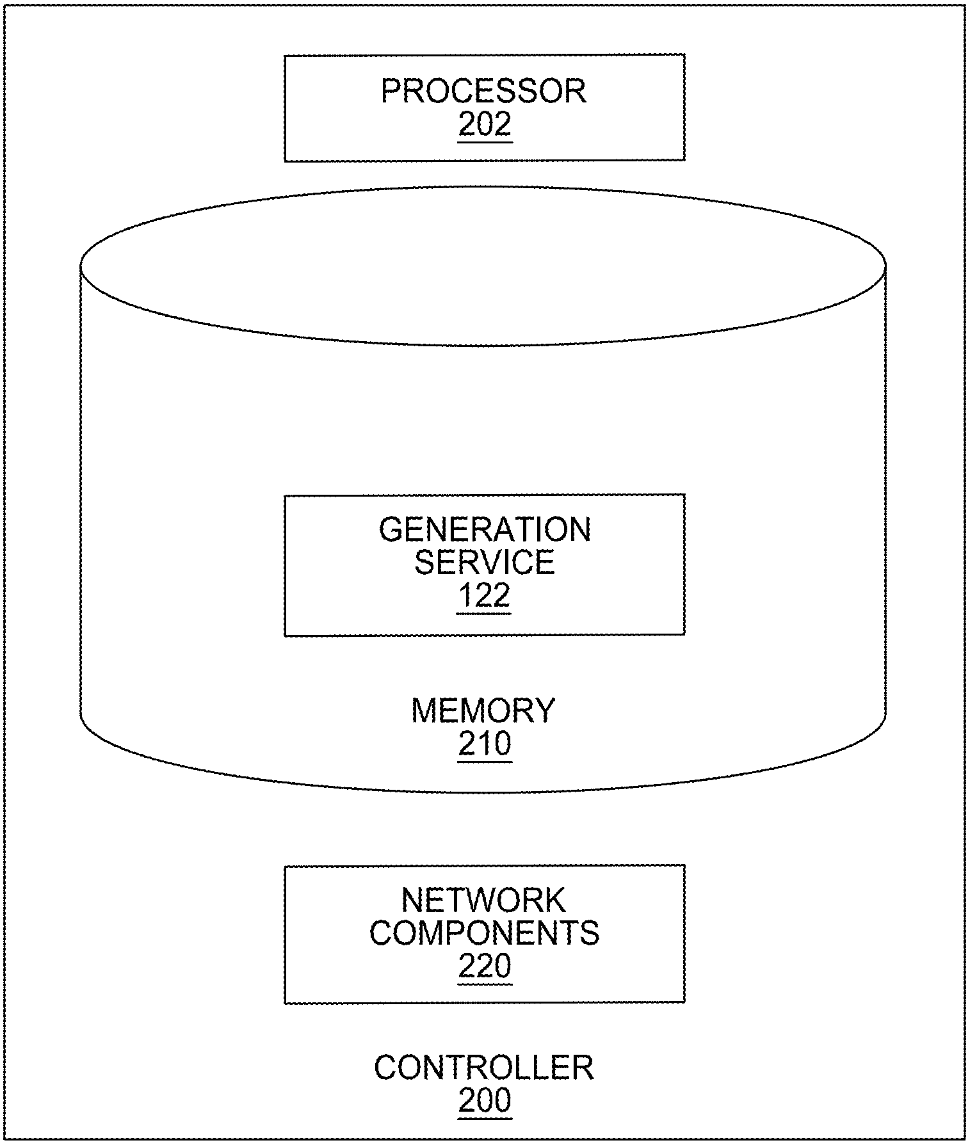
FIG. 2 depicts a block diagram for a controller for generative digital printing, according to one embodiment.

FIG. 2 depicts a block diagram for a controller for generative digital printing, according to one embodiment. In an embodiment, the controller 200 corresponds with the generative layer 120 illustrated in FIG. 1. The controller 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the controller 200 to interface with components over a network (e.g., as illustrated in FIG. 1). For example, the controller 200 can use the network components 220 to interface with remote storage and compute nodes using a communication network. The controller 200 can interface with other elements in the system over a LAN, for example an enterprise network, a WAN, the Internet, or any other suitable network. The network components 220 can include wired, WiFi or cellular network interface components and associated software to facilitate communication between the controller 200 and a communication network.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the controller 200. The program code is generally described as various functional "applications" or "services" within the memory 210, although alternate implementations may have different functions and/or combinations of functions. Within the memory 210, a generation service 122 facilitates creating digital artwork by generating combinations (e.g., all possible combinations) of input artwork elements (e.g., artwork elements 112 illustrated in FIG. 1) and using these combinations, along with one or more layering techniques, to create generated digital artwork (e.g., the generated digital artwork 132 illustrated in FIG. 1). This is discussed further, below, with regard to FIGS. 3-6.

Although FIG. 2 depicts the generation service 122 as located in the memory 210, that representation is merely provided as an illustration for clarity. More generally, the controller 200 may include one or more computing platforms, such as computer servers for example, which may be co-located, separated, or may form an interactively linked but distributed system, such as a cloud-based system (e.g., a public cloud, a private cloud, a hybrid cloud, or any other suitable cloud-based system). As a result, the processor 202 and memory 210 may correspond to distributed processor and memory resources within a computing environment. Further, in an embodiment aspects of the generation service 122 may be separated, and divided across any suitable number of computing systems or compute nodes (e.g., in a cloud computing system).

Figure 3:
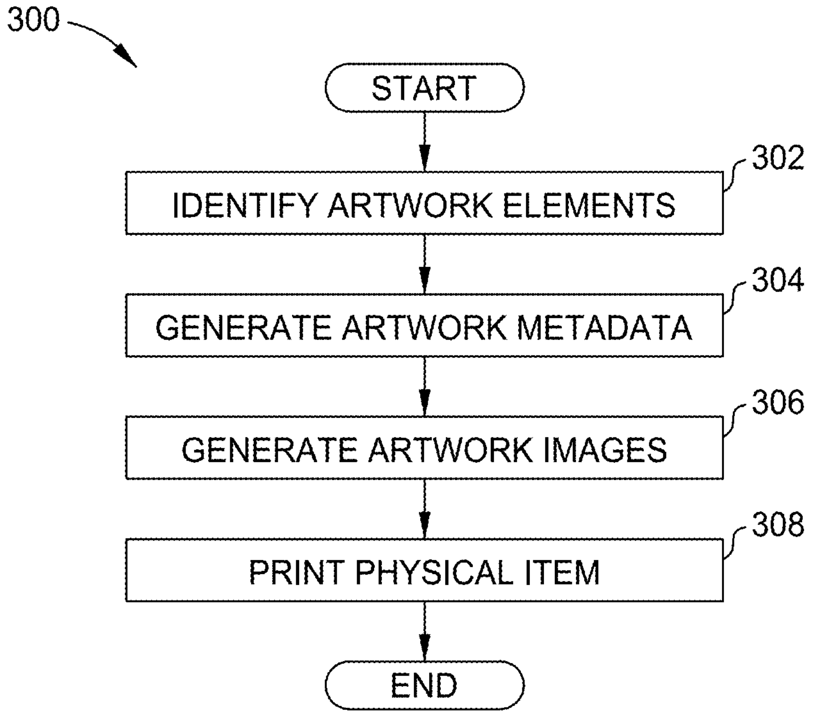
FIG. 3 is a flowchart illustrating generative digital printing, according to one embodiment.

FIG. 3 is a flowchart 300 illustrating generative digital printing, according to one embodiment. At block 302 a generation service (e.g., the generation service 122 illustrated in FIGS. 1-2) identifies artwork elements. For example, the generation service can identify input artwork elements (e.g., the artwork elements 112 illustrated in FIG. 1) that include a defined set of artistic elements crafted by one or more artists. These artwork elements can be retrieved from a suitable electronic repository (e.g., a local or remote electronic repository), provided through a suitable communication network (e.g., as streaming data), provided using a suitable application programming interface (API), or identified using any other suitable technique.

At block 304, the generation service generates artwork metadata. In an embodiment, the generation service can generate associated metadata that describes the individual elements used in the specific artwork. This metadata can be included in the final artwork, and used to identify the combination of elements used in the generated artwork. This is illustrated further, below, with regard to FIGS. 8A-B. In an embodiment, the generation service identifies artwork options or variants associated with the artwork elements (e.g., each of the artwork elements identified at block 302, above), determines combinations of element (e.g., combinations of element options), and generates metadata for each combination. This is discussed further, below, with regard to FIG. 4.

At block 306, the generation service generates artwork images. For example, the generation service can use layering to take into account an order of elements to ensure appropriate positioning and overall coherence of the final artwork. Furthermore, each element can have multiple associated layers and the generation service can apply color palettes using gradient maps. This is discussed further, below, with regard to FIGS. 5-6.

At block 308, a printing service (e.g., the printing service 142 illustrated in FIG. 1) prints a physical item from the artwork. In an embodiment, at block 306 the generation service generates one or more print-ready files for physical items using the artwork. Additionally, the generation service can include in the print-ready files associated metadata that describes the individual elements used in the specific artwork (e.g., the metadata generated at block 304). In an embodiment, the printing service can print any suitable physical media made from any suitable physical materials (e.g., as discussed above in relation to the printing layer 140 illustrated in FIG. 1). As discussed above, printing physical items is merely on embodiment. Alternatively, or in addition, the generation service can be used to generate digital items (e.g., in addition to, or instead of, physical items).

Figure 4:
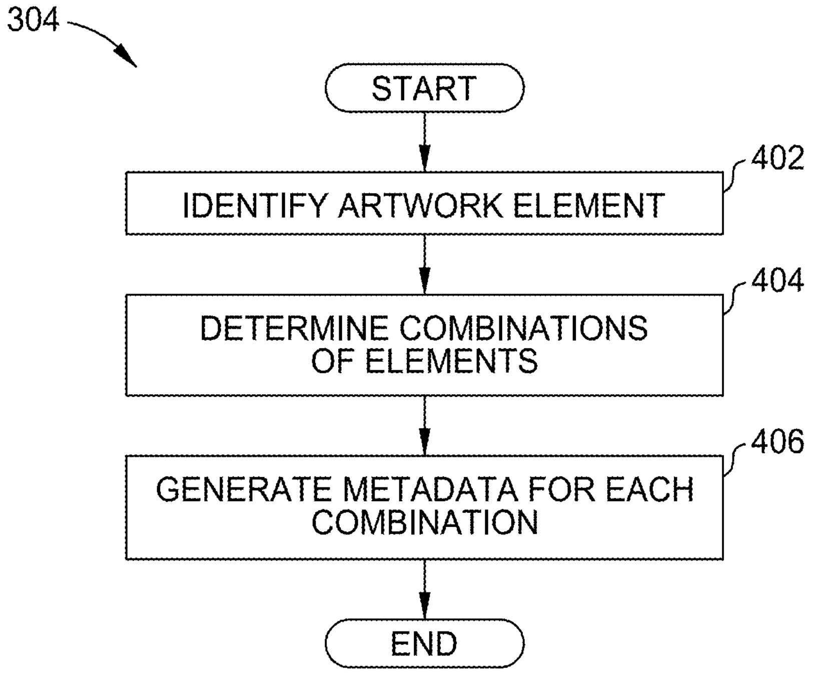
FIG. 4 is a flowchart illustrating generating artwork metadata for generative digital printing, according to one embodiment.

FIG. 4 is a flowchart illustrating generating artwork metadata for generative digital printing, according to one embodiment. In an embodiment, FIG. 4 corresponds with block 304 illustrated in FIG. 3, above. At block 402 a generation service (e.g., the generation service 122 illustrated in FIGS. 1-2) identifies artwork elements.

In an embodiment, as discussed above, multiple artwork elements (e.g., generated by human artists) are combined in different permutations to produce varying designs (e.g., unique designs). Further, one or more of these artwork elements can include several available options, or variants (e.g., 5 to 8 options for a given element). This is merely an example, and any suitable number of options can be used for any suitable artwork elements. Further, in one embodiment each artwork element has multiple options. Alternatively, a subset (e.g., at least one, but less than all) of the artwork elements include multiple options (e.g., one or more elements can include only one option, the number of options can vary between elements, or the generation service can use any other suitable technique).

At block 404, the generation service determines combinations of elements. As discussed above, in an embodiment a given artwork element can have multiple possible options (e.g., multiple possible variants). The generation service can generate possible combinations of options. In an embodiment, the generation service determines all possible combinations of options for a given set of artwork elements. For example, the generation service can use any suitable combinatorial algorithm or technique to generate the possible combinations. Creating all possible combinations is merely one example. Alternatively, or in addition, the generation service can generate a subset of all possible combinations. For example, the generation service can use a threshold to identify a maximum number of combinations (e.g., a user configurable threshold), and can suitable limit the number of combinations to stay below this threshold. This can include evenly distributing identified combinations among the set of possible combinations, distributing identified combinations to over-represent particular options (e.g., preferred options or any other suitable preference(s)) in the subset of identified combinations, or any other suitable technique.

At block 406, the generation service generates metadata for each combination. For example, the generation service can generate metadata describing which options are used in each combination. This is illustrated further, below, with regard to FIGS. 8A-B.

Figure 5:
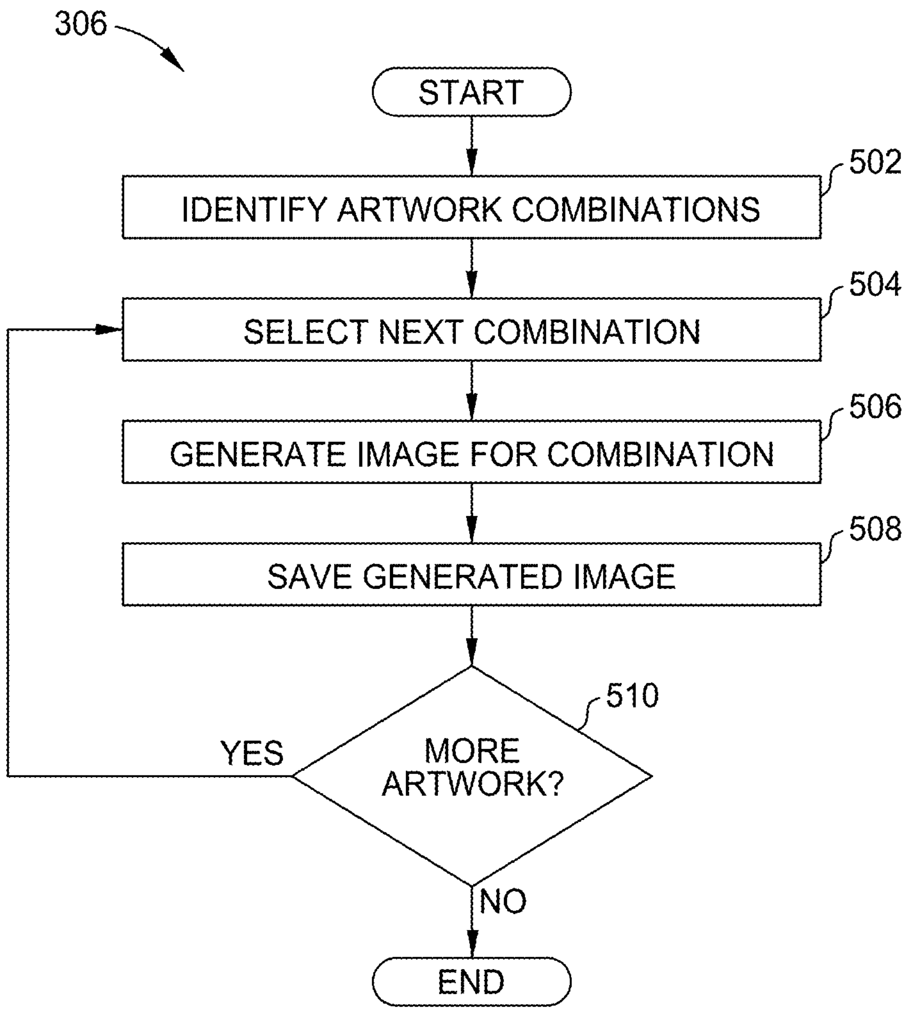
FIG. 5 is a flowchart illustrating generating output artwork for generative digital printing, according to one embodiment.

FIG. 5 is a flowchart illustrating generating output artwork for generative digital printing, according to one embodiment. In an embodiment, FIG. 5 corresponds with block 306 illustrated in FIG. 3, above. At block 502 a generation service (e.g., the generation service 122 illustrated in FIGS. 1-2) identifies artwork combinations.

As discussed above, in an embodiment a given artwork can be made up of a number of elements, each of which can have multiple possible options (e.g., multiple possible variants). For example, a given artwork could have the elements: ["template", "background", "face", "body", "hair"], each of which could have multiple options (e.g., multiple variants). These are merely an example. The generation service can generate possible combinations of options, for a given set of elements, or identify previously generated combinations of options. In an embodiment, the generation service determines all possible combinations of options for a given set of artwork elements. This is merely an example. As discussed above in relation to block 404 illustrated in FIG. 4, the generation service can generate any suitable number of combinations (e.g., fewer than all possible combinations). In an embodiment, the generation service can combine block 502 with block 404 illustrated in FIG. 4, generating the combinations of options once. Alternatively, the generation service can generate the artwork combinations both in relation to block 404 and block 502.

At block 504, the generation service selects a next combination of elements, from the set of generated artwork combinations (e.g., identified at block 502). In an embodiment, as discussed above, multiple artwork elements (e.g., generated by human artists) are combined in different permutations to produce varying designs (e.g., unique designs). The generation service can generate artwork for numerous possible combinations of elements. For example, the generation service can select a next set of options for the elements: [“template”, “background”, “face”, “body”, “hair”] (e.g., a given option for the template, background, face, body, and hair).

At block 506, the generation service generates an image for the combination. In an embodiment, the generation service iterates through each option. For example, the artwork can have a defined layering order (e.g., defined by the artist(s)), and the generation service can iterate through the elements in the layering order. The generation service can retrieve element images, colorize the images (e.g., using a gradient map), and layer the images. This is discussed further, below, with regard to FIG. 6.

At block 508, the generation service saves the generated image. For example, the generation service can save an image made up of the generated element combination, colorized and layered.

At block 510, the generation service determines whether more artwork is available. If so, the flow returns to block 506 and the generation service continues to iterate through the combinations of artwork elements. If not, the flow ends.

Figure 6:
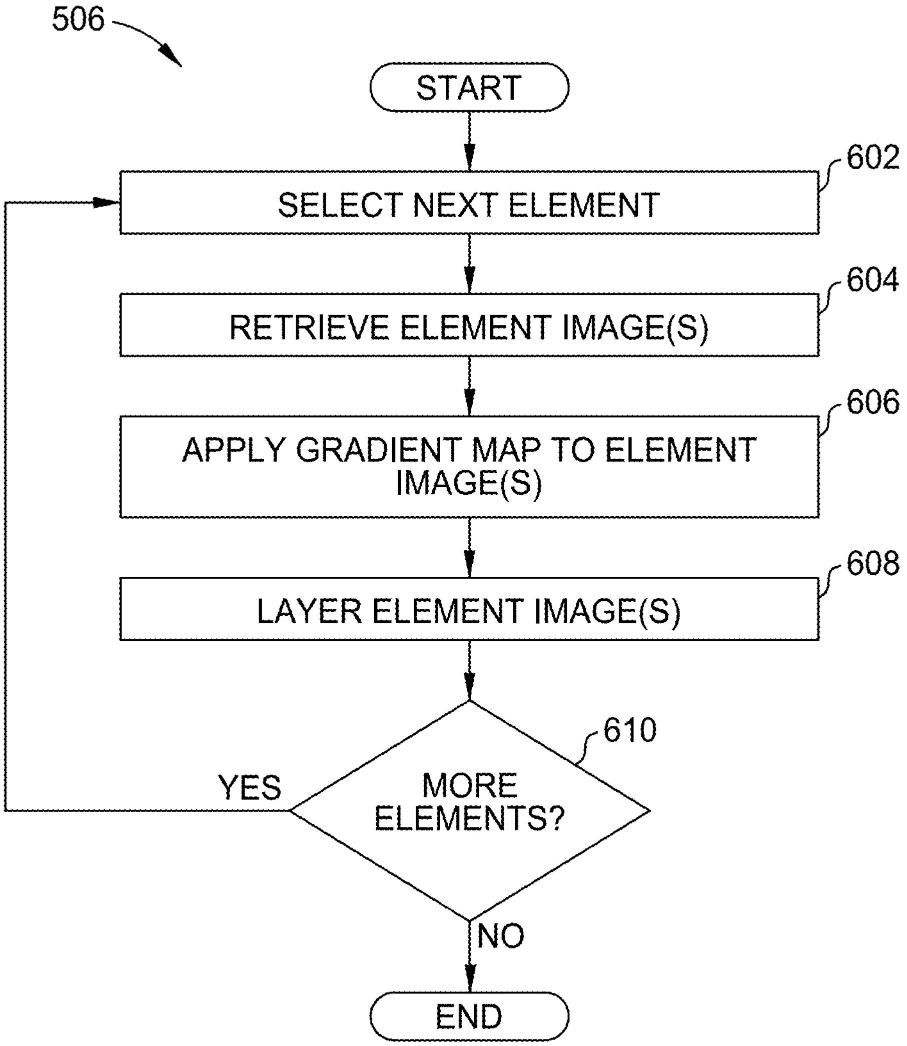
FIG. 6 is a flowchart illustrating generating an image for a given combination of artwork elements, according to one embodiment

FIG. 6 is a flowchart illustrating generating an image for a given combination of artwork elements, according to one embodiment. In an embodiment, FIG. 6 corresponds with block 506 illustrated in FIG. 5. At block 602 a generation service (e.g., the generation service 122 illustrated in FIGS. 1-2) iterates through elements and selects a next element (e.g., from the given combination). As discussed above, the generation service can select elements in a layering order (e.g., a bottom layer first, as defined by one or more artists).

At block 604, the generation service retrieves one or more element images. In an embodiment, the generation service retrieves one or more images of a given element, for the given combination. For example, as discussed above the elements could include: [“template”, “background”, “face”, “body”, “hair”]. The generation service could identify the template as the first element (e.g., based on a layering order placing the template as the bottom layer), and could retrieve one or more images of the template associated with the desired combination (e.g., the template with the selected option(s) or variant(s) identified by the combination generated at block 502 in FIG. 5).

At block 606, the generation service applies a gradient map to the one or more element images. In an embodiment, the input artwork elements (e.g., the artwork elements 112 illustrated in FIG. 1) can include grayscale versions of the artwork elements, layering order data, and color maps (e.g., gradient maps) for coloring the elements in the final artwork. The generation service can use the gradient maps (or any other suitable color maps) to colorize grayscale versions of the artwork elements.

For example, the generation service can first load available color maps. The generation service can then identify each combination of elements. For example, each combination of elements could be stored as an image file in a suitable file system. In this example, the generation service can identify each combination based on file path. This is merely an example, and the generation service can use any suitable technique. For each combination of elements, the generation service can apply a corresponding color map. In an embodiment, the generation service uses associated metadata (e.g., generated as discussed in relation to block 304 in FIG. 3, above) to identify the color map to use for each combination of elements. In one example, the metadata is stored in a filename for an image file associated with the combination of elements, and the generation service extracts the metadata from the filename and uses the metadata to identify a color map for the image file. Further, masking can be used to modify colors across various artworks. This is discussed further, below, with regard to FIG. 9.

As discussed above, in one embodiment the generation service receives grayscale images of the artwork elements and colorizes the image (e.g., using a gradient map, masking, and any other suitable technique). But this is merely an example. Alternatively, or in addition, the generation service receives colorized, or partially colorized, images of elements and generates the artwork from the received images.

At block 608, the generation service layers the element images. In an embodiment, a given piece of artwork can have a layering order for elements (e.g., [“template”, “background”, “face”, “body”, “hair”] in the example above). Further, each element can itself have a layering order. The layering order(s) can be used to take into account the order of elements and options to ensure appropriate positioning and overall coherence of the final artwork. For example, a layering order could identify various layers of a hair element that go in front of, or behind, corresponding layers of a body element. Using a layering order in this way (e.g., as opposed to simply saying a hair element goes in front of a body element) provides for much more precise and accurate generation.

At block 610, the generation service determines whether more elements are present in the artwork combination of elements. If so, the flow returns to block 602. If not, the flow ends.

Figure 7A:
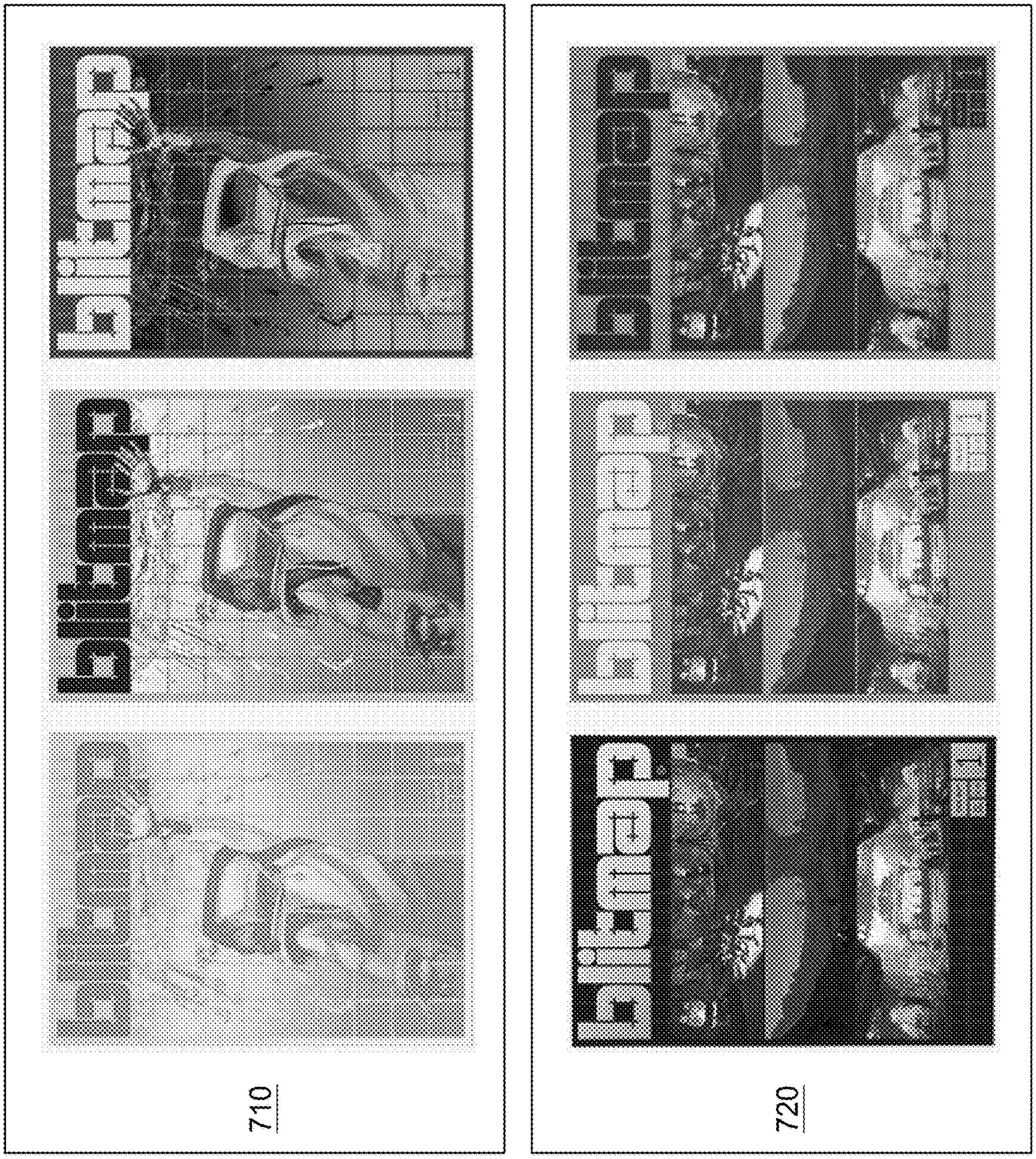
FIGS. 7A-B illustrate example output for generative digital printing, according to one embodiment.

FIG. 7A illustrates example output for generative digital printing, according to one embodiment. As illustrated, these examples 700 include color variations in rows 710 and 720. For example, the elements are the same in the three artwork images illustrated in row 710, but the color is changed. As another example, the elements in the three artwork images in the row 720 are also the same, with the color changed.

Figure 7B:
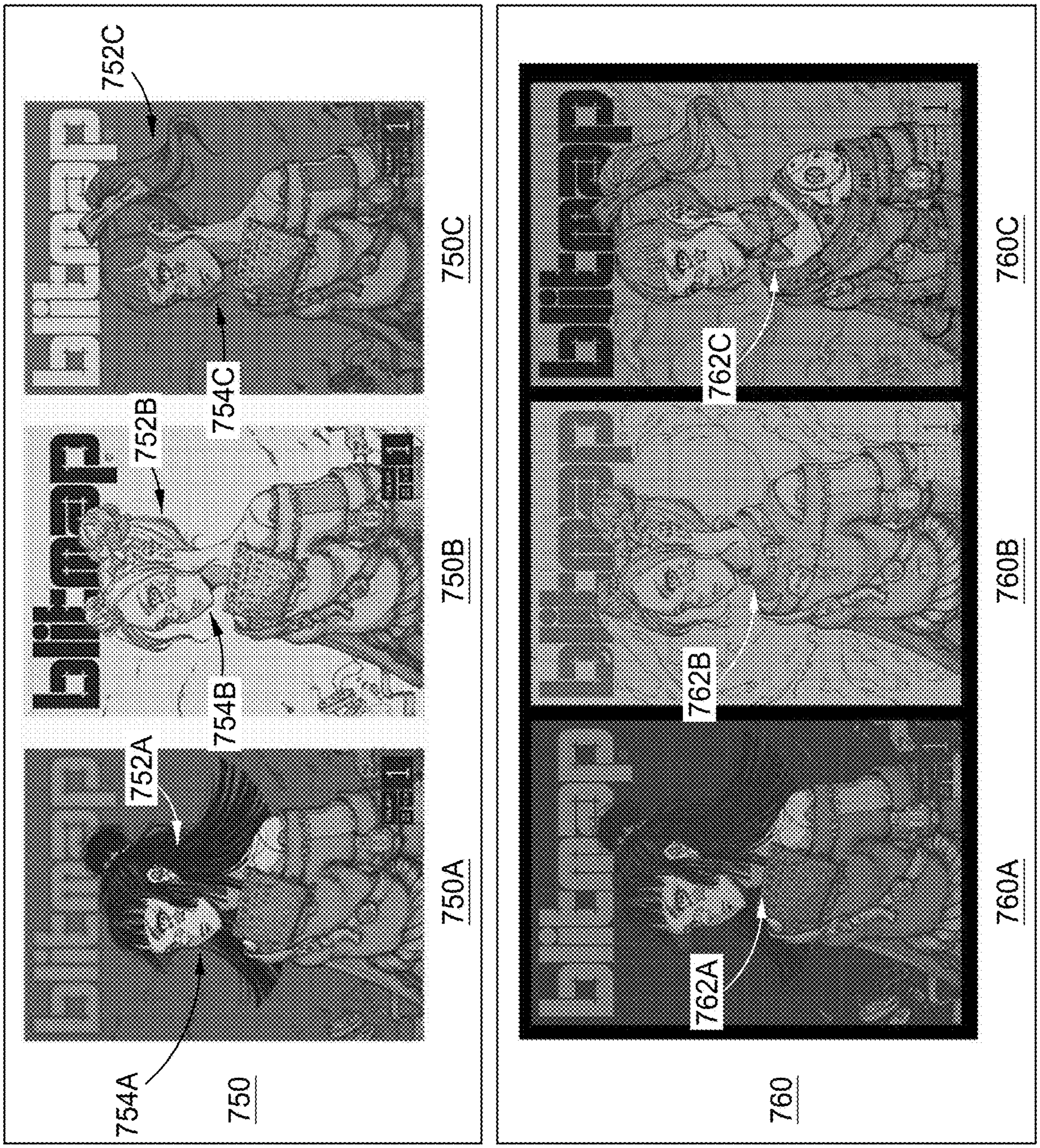

FIG. 7B illustrates further example output for generative digital printing, according to one embodiment. As illustrated, these examples 740 include element changes (e.g., hairstyle, facial expression, clothing or other accessories, or any other suitable options or variants for the elements) for the three images in each of the rows 750 and 760. A first row 750 includes three artwork images 750A, 750B, and 750C. In an embodiment, these images 750A-C are generated using the techniques discussed above in relation to FIGS. 3-6. The color varies across these images 750A-C, as do options for the elements. For example, the first artwork image 750A includes a facial expression 754A and a hairstyle 752A. The second artwork image 750B includes a different facial expression 754B and a different hairstyle 752B. The third artwork image 750C includes another different facial expression 754C and another different hairstyle 752C. In an embodiment, each of the images 750A-C is unique, based on the elements, color, or both.

As another example, a row 760 includes three artwork images 762A, 762B, and 762C. In an embodiment, these images 760A-C are generated using the techniques discussed above in relation to FIGS. 3-6. The artwork image 760A includes a clothing element 762A (e.g., a collar). The artwork image 760B includes a different clothing element 762B, and the artwork image 760C includes another different clothing element 762C, among other differences. As for the row 750, each of the images 760A-C is unique, based on the elements, color, or both.

Figure 8A:
FIGS. 8A-B illustrate further examples of output for generative digital printing, according to one embodiment.
Figure 8B:
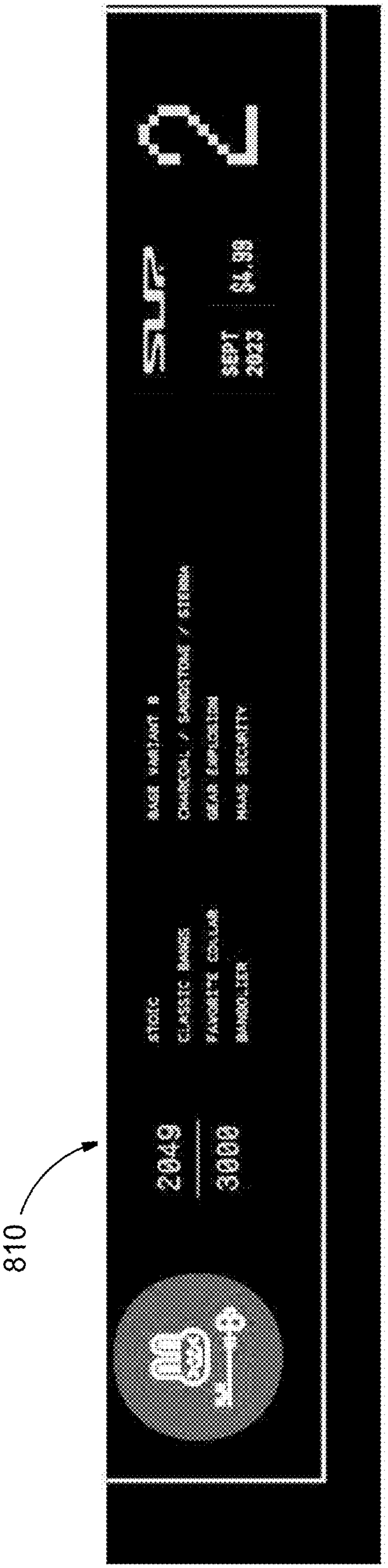

FIGS. 8A-B illustrate further examples of output for generative digital printing, according to one embodiment. In an embodiment, the examples 800 are similar to the example artwork images 750A-C and 760A-C illustrated in FIG. 7B, with the addition of exposed metadata 810 and 820. For example, the metadata 810 is illustrated at the bottom of the images in FIG. 8A, and magnified for easier illustration in FIG. 8B.

The metadata 810 includes names for each trait used (e.g., "STOIC," "CLASSIC BANGS," "FAVORITE COLLAR," "BANDOLIER," "BASE VARIANT B," "CHARCOAL/SANDSTONE/SIENNA," "GEAR EXPLOSION," "HAAS SECURITY") along with the total run from the print and where each individual cover sits in the sequence of the print (e.g., number 2049 out of a total run of 3000). In an embodiment, this can be an important quality for collectors where knowing the total print run for something and whether you have issue the first issue printed, or issue 2049 out of 3000 impacts value. This also creates an easy way for collectors to track the status of available issues and provides a clear way to communicate about them.

For example, in an embodiment individual images can be tracked using codes (e.g., QR codes or secret phrases). A recipient of a physical item can use these codes to retrieve a digital version of the artwork. This can allow for correlation between recipients of physical items, and digital items.

Figure 9:
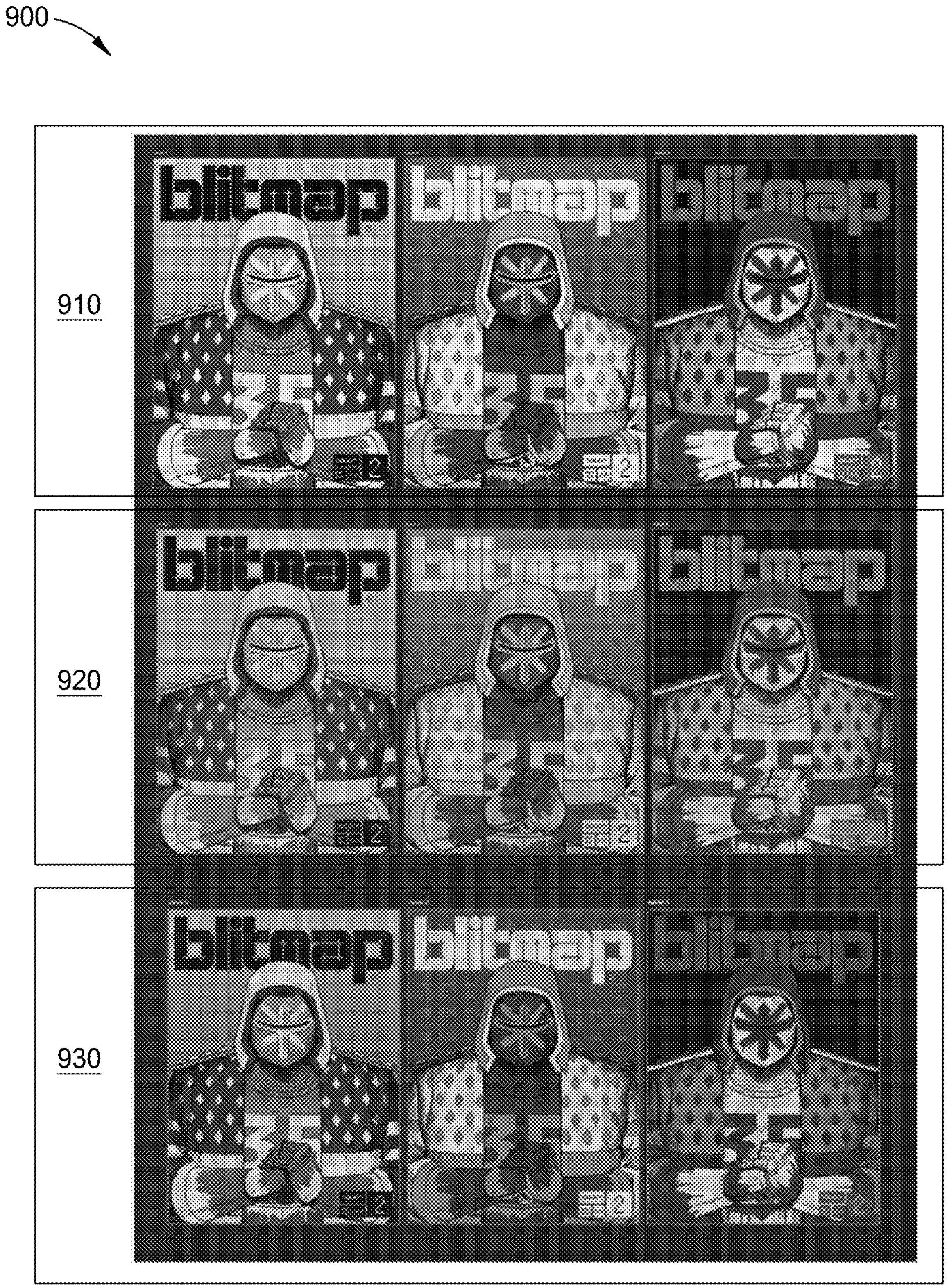
FIG. 9 illustrates additional examples of output for generative digital printing, according to one embodiment.

FIG. 9 illustrates additional examples of output for generative digital printing, according to one embodiment. In an embodiment, the examples 900 are similar to the examples 700 illustrated in FIG. 7A. The examples 900 illustrate a range from a three or four color gradient palette via a masking approach. Each row 910, 920, and 930 in the examples 900 uses only one gradient palette, but the range and result via masking makes the various images look entirely different. In an embodiment, masking allows for the generation service to create a very large number of designs from a small number of color pallets.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a computer, a special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:

identifying a plurality of artwork elements;

generating a plurality of artwork combinations using the plurality of artwork elements, wherein each of the artwork combinations comprises two or more of the plurality of artwork elements, and wherein each of the artwork combinations is unique compared with the other artwork combinations in the plurality of artwork combinations;

determining a plurality of metadata relating to the plurality of artwork combinations;

generating, using one or more computer processors, a first image using the plurality of artwork combinations, comprising:

selecting a first artwork combination from among the plurality of artwork combinations, the first artwork combination comprising a first plurality of artwork elements;

retrieving a first plurality of images corresponding to the first plurality of artwork elements;

identifying a layering order for the first plurality of artwork elements, wherein each of the first plurality of artwork elements comprises a plurality of layers, and wherein the layering order identifies, for each of the first plurality of artwork elements, an order of the plurality of layers relative to layers of other artwork elements of the first plurality of artwork elements; and creating the first image based on combining the first plurality of images using the layering order; and printing a physical item using the first image and the determined plurality of metadata.

2. The computer-implemented method of claim 1, wherein the first plurality of images are grayscale images, and wherein creating the first image based on combining the first plurality of images using the layering order comprises:

colorizing the plurality of images.

3. The computer-implemented method of claim 2, wherein colorizing the plurality of images uses a gradient map.

4. The computer-implemented method of claim 3, wherein colorizing the plurality of images further uses a mask to modify one or more colors in the first image.

5. The computer-implemented method of claim 1, wherein generating the plurality of artwork combinations using the plurality of artwork elements comprises generating every possible combination of the plurality of artwork elements.

6. The computer-implemented method of claim 1, wherein the first image comprises a visible display of the plurality of metadata, and wherein the plurality of metadata describes the artwork elements included in the first artwork combination.

7. A non-transitory computer program product comprising:

one or more non-transitory computer readable media containing, in any combination, computer program code that, when executed by operation of any combination of one or more processors, performs operations comprising:

identifying a plurality of artwork elements;

generating a plurality of artwork combinations using the plurality of artwork elements, wherein each of the artwork combinations comprises two or more of the plurality of artwork elements, and wherein each of the artwork combinations is unique compared with the other artwork combinations in the plurality of artwork combinations;

determining a plurality of metadata relating to the plurality of artwork combinations;

generating a first image using the plurality of artwork combinations, comprising:

selecting a first artwork combination from among the plurality of artwork combinations, the first artwork combination comprising a first plurality of artwork elements;

retrieving a first plurality of images corresponding to the first plurality of artwork elements;

identifying a layering order for the first plurality of artwork elements, wherein each of the first plurality of artwork elements comprises a plurality of layers, and wherein the layering order identifies, for each of the first plurality of artwork elements, an order of the plurality of layers relative to layers of other artwork elements of the first plurality of artwork elements; and creating the first image based on combining the first plurality of images using the layering order; and printing a physical item using the first image and the determined plurality of metadata.

8. The non-transitory computer program product of claim 7, wherein the first plurality of images are grayscale images, and wherein creating the first image based on combining the first plurality of images using the layering order comprises:

colorizing the plurality of images.

9. The non-transitory computer program product of claim 8, wherein colorizing the plurality of images uses a gradient map.

10. The non-transitory computer program product of claim 9, wherein colorizing the plurality of images further uses a mask to modify one or more colors in the first image.

11. The non-transitory computer program product of claim 7, wherein generating the plurality of artwork combinations using the plurality of artwork elements comprises generating every possible combination of the plurality of artwork elements.

12. The non-transitory computer program product of claim 7, wherein the first image comprises a visible display of the plurality of metadata, and wherein the plurality of metadata describes the artwork elements included in the first artwork combination.

13. A system, comprising:

one or more processors; and one or more memories storing a program, which, when executed on any combination of the one or more processors, performs operations, the operations comprising:

identifying a plurality of artwork elements;

generating a plurality of artwork combinations using the plurality of artwork elements, wherein each of the artwork combinations comprises two or more of the plurality of artwork elements, and wherein each of the artwork combinations is unique compared with the other artwork combinations in the plurality of artwork combinations;

determining a plurality of metadata relating to the plurality of artwork combinations;

generating a first image using the plurality of artwork combinations, comprising:

selecting a first artwork combination from among the plurality of artwork combinations, the first artwork combination comprising a first plurality of artwork elements;

retrieving a first plurality of images corresponding to the first plurality of artwork elements;

identifying a layering order for the first plurality of artwork elements, wherein each of the first plurality of artwork elements comprises a plurality of layers, and wherein the layering order identifies, for each of the first plurality of artwork elements, an order of the plurality of layers relative to layers of other artwork elements of the first plurality of artwork elements; and creating the first image based on combining the first plurality of images using the layering order; and printing a physical item using the first image and the determined plurality of metadata.

14. The system of claim 13, wherein the first plurality of images are grayscale images, and wherein creating the first image based on combining the first plurality of images using the layering order comprises:

colorizing the plurality of images using a gradient map.

15. The system of claim 14, wherein colorizing the plurality of images further uses a mask to modify one or more colors in the first image.

16. The system of claim 13, wherein generating the plurality of artwork combinations using the plurality of artwork elements comprises generating every possible combination of the plurality of artwork elements.

17. The system of claim 13, wherein the first image comprises a visible display of the plurality of metadata, and wherein the plurality of metadata describes the artwork elements included in the first artwork combination.

* * * * *